C. SCHICKERLING.
AUTOMOBILE LAMP BULB.
APPLICATION FILED JULY 7, 1917.

1,262,395.

Patented Apr. 9, 1918.
2 SHEETS—SHEET 1.

WITNESSES

INVENTOR
C. Schickerling
BY
ATTORNEYS

C. SCHICKERLING.
AUTOMOBILE LAMP BULB.
APPLICATION FILED JULY 7, 1917.

1,262,395.

Patented Apr. 9, 1918.
2 SHEETS—SHEET 2.

WITNESSES

INVENTOR
C. Schickerling
BY
ATTORNEYS

UNITED STATES PATENT OFFICE.

CONRAD SCHICKERLING, OF WEEHAWKEN, NEW JERSEY, ASSIGNOR TO LILLIE E. SCHICKERLING, OF WEEHAWKEN, NEW JERSEY.

AUTOMOBILE-LAMP BULB.

1,262,395.  Specification of Letters Patent.  Patented Apr. 9, 1918.

Application filed July 7, 1917. Serial No. 179,159.

*To all whom it may concern:*

Be it known that I, CONRAD SCHICKERLING, a subject of the Emperor of Germany, and resident of Weehawken, in the county of Hudson and State of New Jersey, have invented a new and Improved Automobile-Lamp Bulb, of which the following is a full, clear, and exact description.

This invention relates to electric lamps and has particular reference to lamp bulbs designed especially for headlights such as are commonly used on or in connection with automobiles or other road vehicles.

Among the objects of the invention is to produce a new type of lamp bulb having inherent within itself a reflecting medium whereby the principal part of the light from the filament is adapted to emerge both directly through the front part of the bulb and indirectly from a reflecting surface formed in or on the back portion of the bulb, the front part of the bulb being provided with light modifying means in the nature of frosting or other suitable translucent medium.

With the foregoing and other objects in view the invention consists in the arrangement and combination of parts, hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figs. 3 and 4, 5 and 6, 7 and 8, 9 and 10 and 11 and 12 are similar pairs of views of other modifications of my invention.

Figure 13:
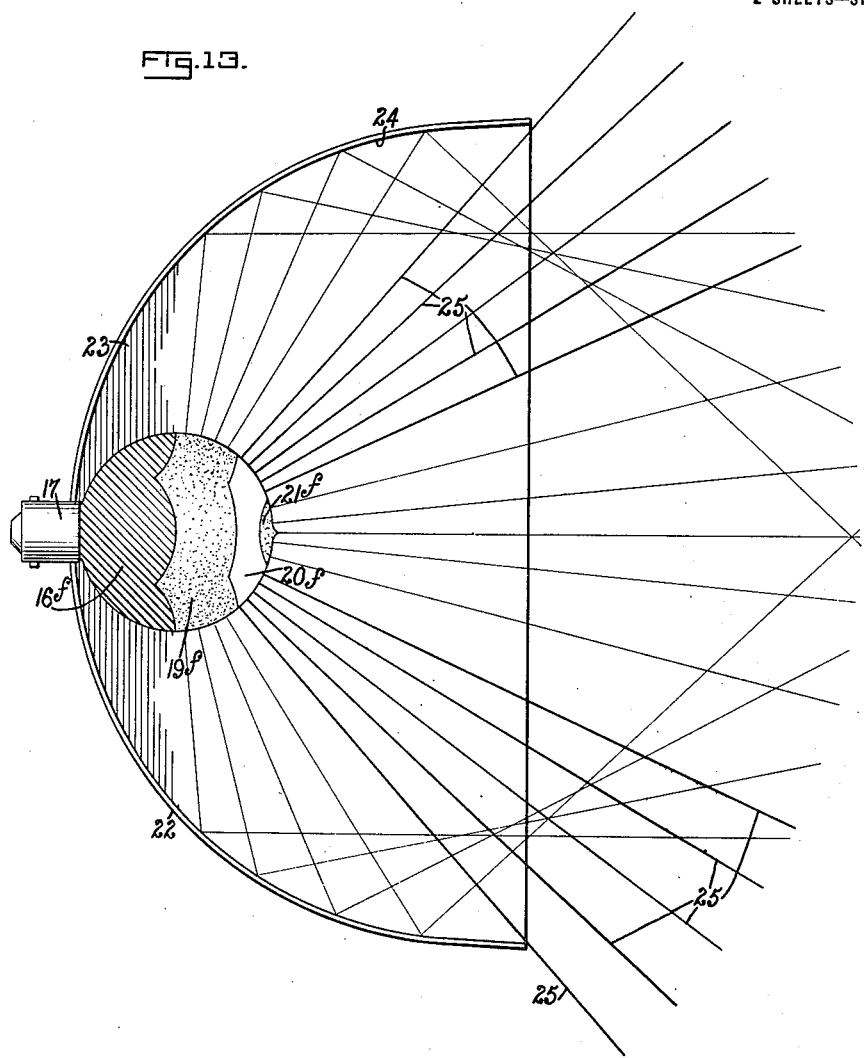
Figure 14:
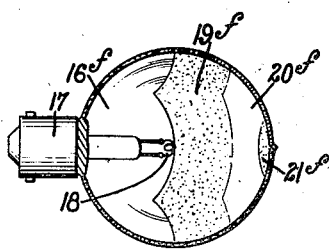

Fig. 13 is a diagram indicating the relation of one of my improved lamps to a reflector casing, surrounding the same and showing the direction in which the principal light rays emerge from the bulb and casing; and Fig. 14 is a vertical longitudinal section of a lamp bulb similar to that shown in Fig. 13.

In each of the forms of lamp bulbs indicated herein I show a construction embodying a bulb or globe having three characters of surfaces or mediums as follows: First, an opaque portion including an internal reflecting surface or medium serving to intensify the light from the filament. Secondly, a clear portion formed in one or more parts of the front portion of the bulb, and thirdly, one or more translucent portions between the front end or point of the bulb and the opaque portion. In all of the forms of the invention illustrated herein the opaque portion having the internal reflecting surface is shown in the elevational views with diagonal shading and in the sectional views with circular shading to represent bright surfaces. The clear portions of the glass bulbs are shown unshaded, and the frosted or otherwise translucent portions are shown stippled.

Figure 1:
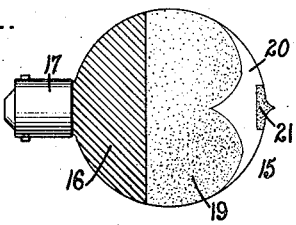
Figure 1 is a side elevation of one form of this new improvement.
Figure 2:
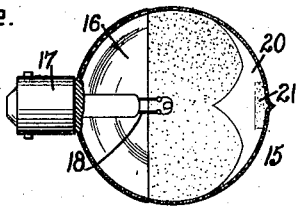
Fig. 2 is a vertical longitudinal section of the same.

Figs. 1 and 2 show a lamp bulb of spherical form, but as to the form of the bulb I do not wish to be unnecessarily restricted in practice. This bulb 15 comprises an opaque internal reflecting portion 16 constituting a segment somewhat less than one half of the sphere and surrounding the base 17 symmetrically. In other words the filament 18 carried by the base is arranged approximately central of the reflecting portion 16. Surrounding the bulb and adjoining the outer edge or rim of the reflecting portion 16 is a translucent portion 19 formed by the frosting of the glass or in some other suitable equivalent manner. The outer edge of this portion 19 is scalloped and bounded by a clear glass portion 20; the tip or point, however, of the bulb is translucent as indicated at 21. This portion, like the part 19, may be frosted for the purpose of softening or modifying the effect of the light that emerges from the interior of the bulb.

Figure 3:
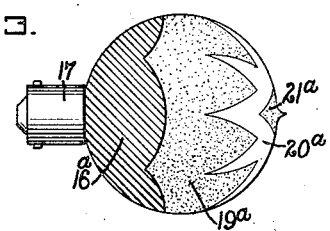
Figure 4:
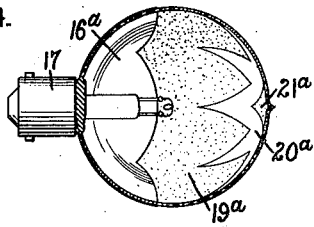

In the form of the lamp shown in Figs. 3 and 4 the same general plan is followed as in the first figures, but the reflecting portion 16ª and the main translucent portion 19ª have a scalloped bounding line and the clear portion 20ª is of a more pronounced star shape where it adjoins the main translucent part. The tip 21ª likewise may be somewhat star shaped.

Figure 5:
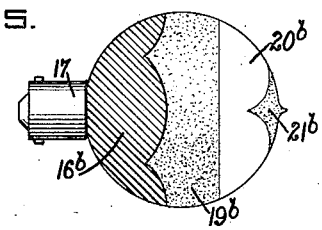
Figure 6:
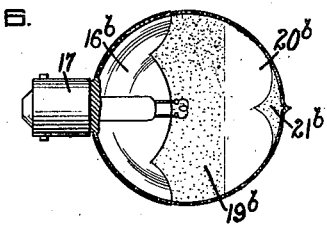

In Figs. 5 and 6 the reflecting portion 16ᵇ may be of a form similar to that in Fig. 3, but the translucent portion 19ᵇ has a circular periphery where it adjoins the clear portion 20ᵇ. The tip 21ᵇ may be in the form of a four pointed star, the points of which being directed toward the lobes of the scallops in the part 16ᵇ.

Figure 7:
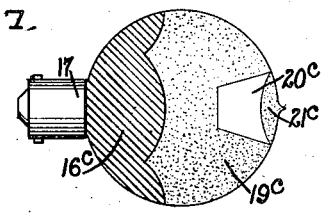
Figure 8:
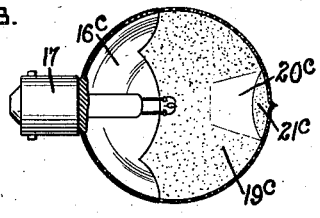

In Figs. 7 and 8 the reflecting portion 16ᶜ may be the same as in the preceding figures but the translucent portion 19ᶜ covers all of the remaining part of the globe except windows 20ᶜ, one formed on each side of the bulb adjacent to the tip portion 21ᶜ. This type of lamp bulb is adapted for use when a relatively large portion of the light is intended or desired to be dispersed from the filament laterally instead of upwardly and downwardly.

Figure 9:
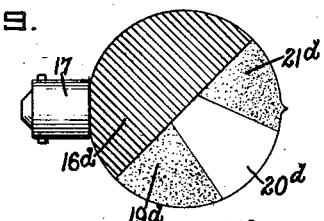
Figure 10:
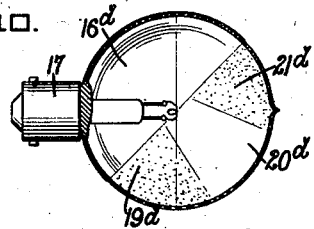

In Figs. 9 and 10, however, the reflecting portion 16ᵈ constitutes a substantial one half of the bulb and is so arranged that the base 17 is eccentric thereto, the greater portion of the reflecting part being above the horizontal axis of the bulb. The two translucent portions 19ᵈ and 21ᵈ are spaced from each other with a zone or belt 20ᵈ of clear glass through which a large portion of the light is ejected out from the filament and internal reflector mainly downwardly ahead of the machine.

Figure 11:
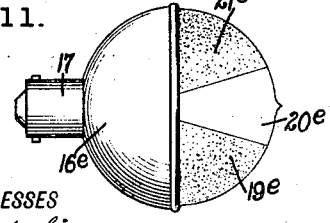
Figure 12:
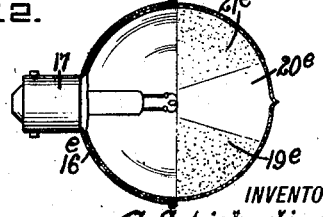

In Figs. 11 and 12 I show a lamp bulb provided at its base portion with a substantially hemispherical metallic cup 16ᵉ carrying an internal reflecting surface. In front of said cup shaped reflector are upper and lower translucent portions 21ᵉ and 19ᵉ respectively spaced from each other and between them the bulb is clear at 20ᵉ. This type of bulb is designed to afford the greatest amount of dispersion of bright light in a substantially horizontal plane in front of the lamp. In this as well as any of the other forms of the lamp the translucent portions may be provided by applying sections of oiled paper, silk or other light modifying mediums instead of frosting or otherwise tinting the bulbs.

In Figs. 13 and 14 the reflecting portion 16ᶠ and the main translucent surrounding portion 19ᶠ are each bounded at its outer edge with scallops, the edges of these parts being approximately parallel. The transparent part 20ᶠ is tipped at 21ᶠ with a translucent portion lying directly in front of the filament.

Fig. 13 shows the relation of the bulb to the reflector casing 22. From this figure it will be appreciated that the direct rays of light from the filament in front of the lamp are modified by the translucent tip portion 21ᶠ so that no glare whatever will be observed directly in front of the lamp. The back portion of the lamp at 23 is in a shadow formed by the reflecting portion 16ᶠ of the bulb. The light transmitted from the filament through the main translucent portion 19ᶠ falls mainly upon the side portion 24 of the reflector from which it is reflected forwardly and dispersed laterally with respect to the longitudinal axis of the lamp in accordance with the laws of reflection. The light, however, passing directly from the filament or reflected by the reflecting surface of the portion 16ᶠ and thence from the bulb emerges from the bulb in accordance with the rays indicated at 25 forming a hollow cone of intense light which emerges from the front of the casing without reflection by the casing. It follows therefore that by this new form of lamp bulb I am able to prevent or neutralize all glare from in front of the lamp and yet secure not only the full force of the light but even an augmented amount or volume of light due to the internal reflecting medium 16.

I claim:

1. The herein described automobile lamp comprising a bulb having a base, an opaque internally reflecting section adjacent to and surrounding the base, a translucent section adjoining the opaque section and surrounding the bulb intermediate its ends, a second translucent section at the outer end of the bulb around the forward end of its longitudinal axis, said bulb having a clear section extending therearound between the two translucent sections.

2. An automobile lamp including a bulb having an annular translucent section extending around its median portion, an opaque section having an inner reflecting surface and covering the entire portion of the bulb rearwardly of said translucent section, a second translucent section surrounding the forward end of the longitudinal axis of the bulb, and a clear section extending around the bulb between the said translucent sections.

CONRAD SCHICKERLING.